Aug. 16, 1955 M. E. WALBERG 2,715,554
BEARING AND SEAL ASSEMBLY
Filed March 30, 1953
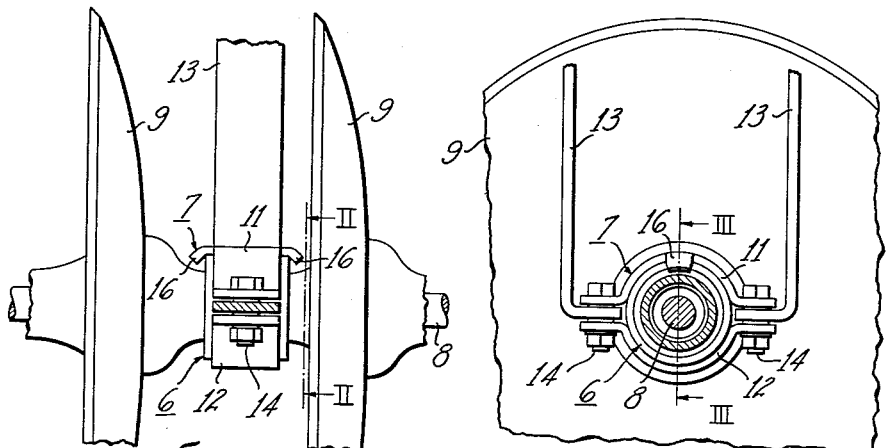
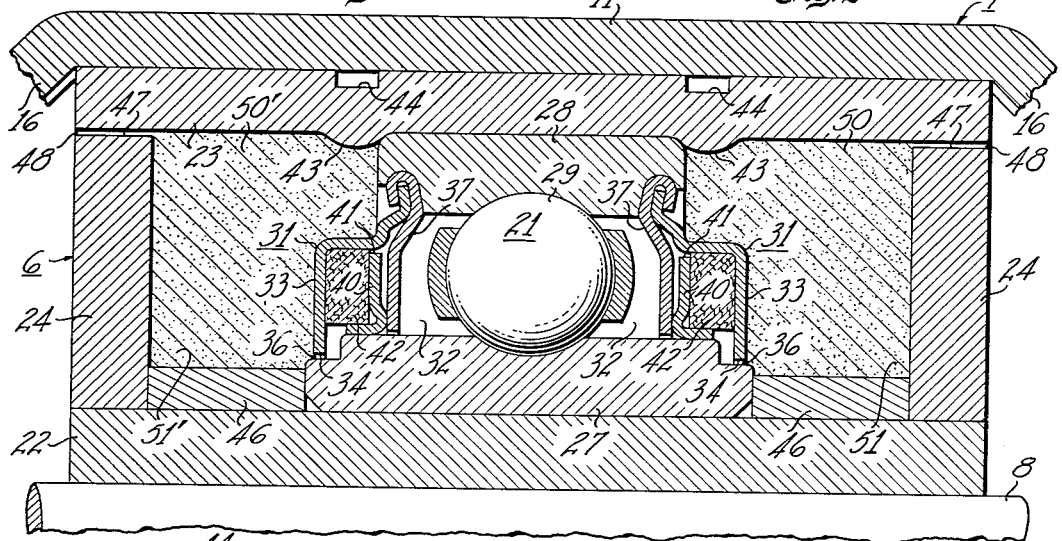
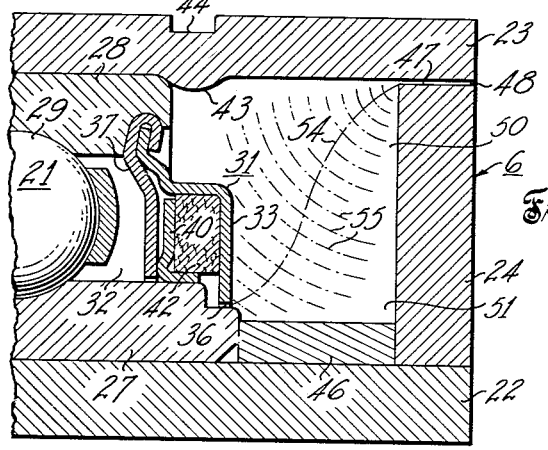
Inventor
Maynard E. Walberg United States Patent Office 2,715,554
Patented Aug. 16, 1955

2,715,554

BEARING AND SEAL ASSEMBLY

Maynard E. Walberg, La Crosse, Wis., assignor to Allis-Chalmers Manufacturing Company, Milwaukee, Wis.

Application March 30, 1953, Serial No. 345,598

4 Claims. (Cl. 308—187.2)

This invention relates to bearings and is more particularly concerned with a bearing assembly which is adapted for use under conditions which subject the bearing to dirt, dust and other deleterious materials.

Antifriction bearings which are used under such conditions ordinarily must utilize a sealing device to retain lubricant in the area of the antifriction elements and to protect these elements from contact with the deleterious materials. More or less elaborate sealing devices of various types have heretofore been suggested for the purpose of providing long life protection of antifriction bearings but the costs of such devices are usually high and sometimes prohibitive for low cost installations. On the other hand, sealed antifriction bearings of low cost types are commercially available which use a relatively inexpensive and simple sealing assembly, one of the elements of which is a seal of felt or some similar material. Such low cost bearings are subject to progressive deterioration when deleterious materials begin to enter the sealing assemblies and become lodged therein. During continued use more harmful materials accumulate and accelerate deterioration of the seals until they become inoperative and the antifriction elements become damaged. Furthermore, in certain applications such as those encountered with agricultural disk harrows, the bearings may encounter stones, stumps and other obstacles which deform the bearing seals and hasten seal deterioration and eventual bearing failure.

Since the life of a bearing used under these detrimental conditions is dependent on the effectiveness of its seal, and since damage and deterioration of seals of economical bearings usually begins soon after use of the bearing begins, an ideal bearing for these conditions would be one which is inexpensive and one in which the seal is protected and kept completely free of foreign substances for the majority of the life of the bearing.

It is an object of this invention to provide an improved and economical bearing assembly which will operate efficiently for a long period of time under adverse conditions caused by the presence of dirt, dust and other deleterious materials.

More specifically, an object of this invention is to provide an improved antifriction bearing and seal assembly wherein a lubricant seal for the antifriction bodies is combined with a packing for intercepting deleterious materials before they can reach the lubricant seal.

Another object of this invention is to combine a bearing, a seal for the bearing and a grease packing for the seal into a unitary structure which may be handled in package form and which may readily be installed on or removed from a shaft by simply sliding the entire unit axially into or out of its installed position.

It is a further object of this invention to provide an improved bearing and seal assembly of the hereinabove outlined character which is extremely simple in construction and economical to manufacture.

These and other objects and advantages are attained by the present invention, various novel features of which will appear from the following description and the accompanying drawings and will be pointed out more particularly in the appended claims.

Referring to the drawings:

Fig. 1 is a partial side view of a bearing and disk assembly for use in a disk harrow or the like;

Fig. 2 is an end view of the structure shown in Fig. 1, with parts shown in section on line II—II in Fig. 1;

Fig. 3 is an enlarged partial section on line III—III in Fig. 2; and

Fig. 4 is a partial view of the structure shown in Fig. 3 with diagrammatic lines added for purposes of explanation.

In the illustrated embodiment of the invention shown in Figs. 1 and 2, a bearing and seal assembly 6 is supported by a bracket structure 7 which is adapted to be attached to a frame (not shown) such as that of a disk harrow. The bearing and seal assembly 6 supports a shaft or axle 8 for rotation relative to the bracket structure 7 and to the frame to which the bracket is attached. Harrow disks 9 are secured to the axle 8 in any suitable manner for rotation in unison therewith.

The bracket structure 7 serves to limit radial and axial displacement of the bearing and seal assembly 6 relative to the frame or body with which the bearing and seal assembly is to be used. The bracket structure illustrated in Figs. 1 and 2 comprises an upper cap 11 and a lower cap 12 which encompass opposite sides of the bearing and seal assembly 6 are secured together and to hanger arms 13 by means of bolts 14. The upper cap 11 is provided with a pair of ears 16 which are turned downwardly toward the lower cap 12 to overlap the ends of the bearing and seal assembly 6 and limit axial displacement thereof relative to the bracket structure 7.

As shown in Fig. 3, the bearing and seal assembly 6 comprises an antifriction bearing unit designated by the reference character 21 mounted between inner and outer mounting sleeves or tubular parts 22 and 23, respectively, to afford relative rotation therebetween; and a pair of annular end plates 24, one at each end of the sleeve 22, which together with the latter and sleeve 23 form an axially enlarged housing structure for the antifriction bearing unit 21.

The antifriction bearing unit 21 may be one of a number of commercially available shielded or sealed bearings comprising a circumferential series of load transmitting antifriction elements in the form of rollers, balls or the like. As illustrated in the preferred embodiment of the invention, the bearing unit 21 is of the ball type used with automotive axles and comprises inner and outer races 27 and 28, respectively, rotatable relative to each other about the same axis on a circumferential series of balls 29. A pair of lubricant seal assemblies 31 are positioned between the races 27 and 28, one at each side of the antifriction elements 29, to form a lubricant compartment 32 around the antifriction bodies 29. Each seal assembly 31 has an axially outer baffle or annular wall 33 rigidly attached at its outer periphery to the outer race 28 for turning movement therewith. The outer baffle 33 has an inner peripheral edge portion 34 in proximate radially spaced relation to a portion of the inner race 27 to form a baffle clearance gap 36. An auxiliary baffle 37 is connected with the outer baffle 33 for rotation therewith and has a radially inner portion in axially spaced relation to the baffle 33 at the axially inner side of the latter. The seal assembly 31 also includes an inner baffle or annular wall 40 which is press fitted upon and turns with the inner race 27 relative to the outer race 28. The inner baffle 40 has an outer peripheral edge 41 in proximity to a radially spaced portion of the outer baffle 33. A seal element 42 of suitable material such as felt is interposed between the outer and inner baffles 33 and 40 and during rotation of one bearing race relative to the other, the seal element may turn with either the inner or outer baffle.

The antifriction bearing unit 21 is operatively interposed between radially opposite portions of the sleeve members 22 and 23 substantially midway between the axially opposite ends of said sleeve members. To prevent axial displacement of the bearing unit 21 relative to the outer mounting sleeve 23, a pair of annular ribs 43 are formed on the inner circumferential surface of the mounting sleeve 23 by rolling grooves 44 into the outside and thereby annularly extruding the inside of the sleeve 23 at the axially opposite ends of the outer race 28 after the bearing unit 21 has been properly positioned axially within the sleeve 23. The inner mounting sleeve 22 is dimensioned to fit over the axle 8 and is press fitted into the inner race 27 so that the inner mounting sleeve 22 and inner race 27 turn together as a unit relative to the outer mounting sleeve 23 and the outer race 28.

The end plates 24 have an outer diameter slightly smaller than the inside diameter of the outer mounting sleeve 23 and are press fitted on the opposite ends of the inner sleeve 22. Interposed between the inner race 27 and the axially inner sides of the end plates 24 are tubular bushings or spacers 46. The spacers are placed on the outside of the inner sleeve 22 so that opposite ends of the spacers abut, respectively, one end of the inner bearing race 27 and one side of the end plates 24. Each end plate 24 has an outside diameter slightly smaller than the inside diameter of the surrounding end portion of the outer sleeve 23 so that, as the end plates rotate relative to the sleeve 23, their circumferential edges 47 have adequate running clearance afforded by housing clearance gaps 48, as shown in Fig. 3. The housing clearance gaps 48 and the baffle clearance gaps 36 are each large enough to permit rotation of the outer sleeve 23 and outer baffles 33 relative to the end plates 24 and inner race 27, and require sealing in order to retain lubricant within lubricant compartment 32 and prevent entry of foreign material into the axially extended housing structure 22, 23 and 24.

Semifluid packing 50 and 50' are enclosed at opposite sides of the bearing unit 21 in compartments 51 and 51' which are formed by the outer sleeve 23, spacers 46, bearing 21 and end plates 24. The semifluid packing 50 at the right side in Fig. 3 acts as a barrier between the right baffle clearance gap 36 and the right housing clearance gap 48, and the semifluid packing 50' at the left side in Fig. 3 similarly acts as a barrier between the left baffle clearance gap 36 and the left housing clearance gap 48.

The compartments 51 and 51' are completely filled with a suitable semifluid packing material which is adapted to intercept foreign matter which may enter the housing 22, 23, 24 through the housing clearance gaps 48. A preferred material for this purpose is a grease of the type used in certain heavy duty installations, such as in the journal boxes of locomotives and other heavy machinery. This type of grease is commonly described as a long life, long fiber grease having a high melt point and a high sodium soap content.

In actual practice a grease marketed under the trade name of "Marfak #5" has been found to provide a suitable packing material in bearing installations of the herein disclosed character for disk harrows. It should be understood, however, that other types of semifluid packing material may be used to serve efficiently as a barrier between the baffle and housing clearance gaps 36 and 48 at the axially opposite sides of the bearing unit 21.

The outer sleeve 23, outer bearing race 28 and outer baffles 33 represent a radially outer unit, and the inner sleeve 22, inner race 27, spacers 46 and end plates 24 represent a radially inner unit, and in the illustrated embodiment of the invention the outer unit is stationary and the inner unit is rotatable relative to the outer unit. During rotation of the inner unit relative to the outer unit, the semifluid packing 50 as shown in Fig. 4 shears between the baffle clearance gap 36 and the housing clearance gap 48 on a shear line 54 which extends through the packing compartments 51 in a generally diagonal direction as indicated in Fig. 4. The packing material at one side of the shear line 54 tends to adhere to the radially outer section 23, 28 and 33, and the packing material at the other side of the shear line 54 tends to adhere to the radially inner section 27, 46 and 24. Due to the semifluid character of the packing material and its tendency to adhere to the relatively rotating sections of the assembly a substantial portion of the packing material will remain at rest while another portion rotates in unison with the radially inner section of the assembly. The zone in which the relatively rotating masses of packing material merge extends along the shear line 54.

In operation, the packing material within the merging zone along the shear line 54 liquefies to a certain extent, and as a result any foreign material which enters through the housing clearance gap 48 becomes trapped in the liquefied portion of the packing material. As the packing material at the end of the shear line nearest the gap 48 becomes saturated with dust, dirt or other foreign material, the consistency of this portion becomes denser than that of the remainder of the packing material, and as a result the material shears along a new line adjacent to that saturated with foreign material. This process of infiltration and saturation continues until the area nearest the housing clearance gap 48 becomes completely saturated with foreign material. Thereafter, additional foreign material entering through gap 48 causes a new area along the instantaneous shear line to be saturated and in this manner a large part of the packing material may become effective to intercept and retain foreign material. During this process the foreign matter will spread in two directions within the packing material, that is, along the shear line 54 and to each side thereof as indicated by the lines 55 in Fig. 4. Contamination of the packing material by ingress of material progresses at a sufficiently slow rate of speed to insure a long period of protection before any foreign material may reach the baffle clearance gap 36. It should also be noted that full advantage is taken of the available packing material by spacing the clearance gaps 36 and 48 axially and radially from each other so that deleterious materials must progress over the greatest cross sectional distance of the packing compartments 51 and 51' and of the semifluid packing 50 and 50' in order to reach the baffle clearance gap 36.

The bearing assembly 6 is a unitary structure which may be readily placed on and removed from the axle or shaft 8 in a very short time. This may be accomplished because the inner sleeve 22 of the bearing and seal assembly may be moved as an assembled unit over the axle shaft 8. It is seen that the fit between an axle or shaft and the inner sleeve 22 is not as critical as the fit ordinarily required between conventionally mounted bearings and axles or shafts.

It should now be apparent that a unitary bearing and seal assembly 6 has been provided in which a housing 22, 23 and 24 contains a bearing unit 21 and semifluid packings 50 and 50', and that the housing acts as a protective guard to prevent damage or deformation of the lubricant seal assemblies 31 of the bearing unit 21, and that the semifluid packings 50 and 50' protect the lubricant seal assemblies 31 from smaller deleterious material which would otherwise enter the seal elements 42 and bring about their deterioration.

It is claimed and desired to secure by Letters Patent:

1. A unitary, grease packed bearing structure adapted for axial movement, as an assembled unit, into and out of installed position on a shaft, said bearing structure comprising a pair of coaxial, radially spaced inner and outer sleeve members; an antifriction bearing of shorter axial length than the axial length of the annular space between said sleeve members operatively interposed between radially opposite portions of the latter substantially midway between the axially opposite ends of each of said sleeve members, said antifriction bearing comprising an inner race secured to said inner sleeve member in surrounding, nonrotatable and axially fixed relation thereto, an outer race surrounded by and secured in nonrotatable, axially fixed relation to said outer sleeve member, and an annular series of antifriction bodies operatively interposed between said inner and outer races; a pair of seals operatively interposed between said races at the axially opposite sides, respectively, of said antifriction bearing; a pair of annular end plates extending radially between said sleeve members at the axially opposite sides, respectively, of said antifriction bearing and at predetermined axial distances from the latter so as to provide a pair of packing compartments at said axially opposite sides, respectively, of said antifriction bearing; each of said end plates being secured at one of its inner and outer peripheries to one of said sleeve members and being of a radial width to substantially close the annular space between said sleeve members; and a mass of semifluid packing grease enclosed within and entirely filling each of said packing compartments.

2. A bearing structure as set forth in claim 1, wherein said end plates are secured to opposite end portions, respectively, of said inner sleeve member, and wherein a pair of annular wall members forming parts, respectively, of said seals, are secured at their outer peripheries to said outer race and have inner peripheries in radially opposed relation to adjacent portions of said inner race.

3. A bearing structure as set forth in claim 1 and further comprising a pair of spacer sleeves at the axially inner sides, respectively, of said end plates and in axial load transmitting engagement with one of said antifriction bearing races.

4. A bearing structure as set forth in claim 3, wherein said spacer sleeves bear axially in opposite directions, respectively, upon end faces of said inner race.

References Cited in the file of this patent
UNITED STATES PATENTS

| | | |
|---|---|---|
| 1,533,184 | Gurney | Apr. 14, 1925 |
| 1,696,938 | Curtis | Jan. 1, 1929 |
| 2,054,581 | Delaval-Crow | Sept. 15, 1936 |
| 2,647,808 | Spurgeon | Aug. 4, 1953 |